(12) United States Patent
Lee (10) Patent No.: US 8,275,038 B2
(45) Date of Patent: Sep. 25, 2012

(54) MOTION DETECTING METHOD AND MOTION DETECTOR

(75) Inventor: Wan-Ting Lee, Taipei (TW)

(73) Assignee: Faraday Technology Corp., Science-Based Industrial Park, Hsin-Chu (TW)

( * ) Notice: Subject to any disclaimer, the term of this patent is extended or adjusted under 35 U.S.C. 154(b) by 367 days.

(21) Appl. No.: 12/627,269

(22) Filed: Nov. 30, 2009

(65) Prior Publication Data

US 2011/0129014 A1   Jun. 2, 2011

(51) Int. Cl.
*H04B 1/66* (2006.01)
*H04N 7/12* (2006.01)
*H04N 11/02* (2006.01)
*H04N 11/04* (2006.01)
*H04N 5/14* (2006.01)
*H04N 9/64* (2006.01)
*G06K 9/46* (2006.01)

(52) U.S. Cl. .................. 375/240.13; 382/236; 348/699; 348/700; 375/240.16

(58) Field of Classification Search ........................ None
See application file for complete search history.

(56) References Cited

U.S. PATENT DOCUMENTS

| 2003/0123551 A1* | 7/2003 | Kim ......................... 375/240.16 |
| 2003/0161402 A1* | 8/2003 | Horowitz ................ 375/240.16 |
| 2003/0230576 A1 | 12/2003 | Lin |
| 2005/0094899 A1* | 5/2005 | Kim et al. ..................... 382/300 |
| 2009/0028427 A1* | 1/2009 | Yamada et al. ............... 382/166 |
| 2009/0196346 A1* | 8/2009 | Zhang et al. ............. 375/240.03 |
| 2011/0026585 A1* | 2/2011 | Watanabe et al. ........... 375/240.2 |

FOREIGN PATENT DOCUMENTS

CN        101090498       12/2007

* cited by examiner

*Primary Examiner* — Joseph Ustaris
*Assistant Examiner* — Edemio Navas, Jr.
(74) *Attorney, Agent, or Firm* — Winston Hsu; Scott Margo (57) ABSTRACT

A motion detecting method and a motion detector are provided. The motion detecting method includes the following steps. When the type of the current macro block (MB) is intra-type (I-type) or predictively-coded type (P-type), a first procedure or a second procedure is performed. The first procedure includes setting the active flag of the current MB according to the type of the previous MB. The second procedure includes setting the active flag of the current MB according to the motion vectors of the previous MB and the current MB. The present invention is capable of reducing the probability of erroneous motion judgments.

13 Claims, 7 Drawing Sheets

| | | | | | |
|---|---|---|---|---|---|
| 0<br>mb6 | 0<br>mb12 | 0<br>mb18 | 1→0<br>mb24 | 0<br>mb30 | 0<br>mb36 |
| 0<br>mb5 | 0<br>mb11 | 0<br>mb17 | 0<br>mb23 | 1→0<br>mb29 | 0<br>mb35 |
| 0<br>mb4 | 0<br>mb10 | 1<br>mb16 | 1<br>mb22 | 0<br>mb28 | 0<br>mb34 |
| 0<br>mb3 | 1<br>mb9 | 1<br>mb15 | 1<br>mb21 | 0<br>mb27 | 0<br>mb33 |
| 0<br>mb2 | 1<br>mb8 | 0<br>mb14 | 0<br>mb20 | 0<br>mb26 | 1<br>mb32 |
| 1→0<br>mb1 | 0<br>mb7 | 0<br>mb13 | 0<br>mb19 | 1<br>mb25 | 1<br>mb31 |

MOTION DETECTING METHOD AND MOTION DETECTOR

BACKGROUND OF THE INVENTION

1. Field of the Invention

The present invention generally relates to a motion-detecting approach, and more particularly, to a motion-detecting approach of videos.

2. Description of Related Art

Along with popular applications of video cameras, the video processing technique is paid attention to by the relevant manufacturers day by day. The motion-detecting approach is a usual video processing technique for judging whether or not the objects in frames are in motions. The motion-detecting approach has broad applications, such as used in security system to detect whether or not a residence is intruded by unknown people or in video-recording system to decide starting video-recording whenever 'motion' occurs in a video stream so as to save the memory space of data.

Generally, the conventional motion-detecting approach is based on detecting the difference between the successive frames so as to judge whether or not 'motion' occurs on the frames. The above-mentioned principle can be in brief that two successive frames are directly compared with each other, and if a difference between the two frames is revealed, 'motion' occurred on the frames is concluded. Since the above-mentioned comparison is conducted on the whole frames, so that a lot of memories are required in addition to larger power consumption.

Another conventional motion-detecting approach is based on utilizing so-called the motion vector of video to judge whether or not 'motion' occurs on the frames. This conventional approach is disadvantageous in that 'motion' erroneous judgments are likely obtained. When the video comes with noise, even though no 'motion' with the object in a frame, the above-mentioned conventional approach may erroneously conclude the frame is in motion and obtains a misjudgement.

Besides, when video come with luma variation, even though no 'motion' with the object in a frame, the above-mentioned conventional approach may still conclude the frame is in motion leading a misjudgement.

SUMMARY OF THE INVENTION

Accordingly, the present invention is directed to a motion detecting method capable of reducing the probability of erroneous motion judgments.

The present invention is also directed to a motion detector capable of reducing the interference of noise on 'motion' judgments.

The present invention provides a motion detecting method, which includes receiving a type and a motion vector of a current macro block (MB) and judging the type of the current MB. When the type of the current MB is intra-type (I-type), according to the motion detecting method of the present invention, a first procedure is performed, wherein the first procedure includes setting the active flag of the current MB as 'motion' when the current MB and a predetermined number of previous MBs prior to the current MB on a time axis are all intra-type, otherwise setting the active flag of the current MB as 'no-motion'. When the type of the current MB is P-type, according to the motion detecting method of the present invention, a second procedure is performed, wherein the second procedure includes calculating the accumulated motion vector of the current MB according to the previous accumulated motion vector of the first previous MB and the motion vector of the current MB, and checking whether or not the accumulated motion vector of the current MB is greater than a first threshold. If it is greater than the first threshold, the active flag of the current MB is set as 'motion'.

In an embodiment of the present invention, the first procedure or the second procedure further includes: receiving the active flags of a plurality of MBs of a current frame, wherein the above-mentioned MBs include the current MB; checking the active flag of each MB set as 'motion' to decide whether or not the checked active flags are adjacent to each other in spacial domain and; if the checked active flags are not adjacent to each other in spacial domain, setting the active flag of each of the MBs not adjacent to each other as 'no-motion'. This connectivity check may be implemented as a spacial-domain filter.

In an embodiment of the present invention, the first procedure or the second procedure further includes: receiving the active flags of a plurality of MBs of a current frame, wherein the above-mentioned MBs include the current MB; checking the active flag of each MB set as 'motion' to decide whether or not the checked active flags are respectively aggregated in a preset shape in spacial domain and, if the checked active flags are not respectively aggregated in the preset shape, setting the active flag of each of the MBs not aggregated in the preset shape as 'no-motion'.

In an embodiment of the present invention, the motion detecting method further includes the following steps. Calculate the first average of the sums of absolute differences of macro blocks whose motion vector is zero of the current frame, wherein the current frame includes the current macro block. Calculate the second average of the sums of absolute differences of macro blocks whose motion vector is zero of the previous frame. Set the number of 'motion' active flags of the current frame as zero when the difference between the first average and the second average is greater than a second threshold.

In an embodiment of the present invention, the motion detecting method further includes the following steps. Compare the sum of absolute differences of the current macro block with the aforementioned first average when the active flag of the current macro block is already set as 'motion'. Reset the active flag of the current macro block as 'no-motion' when the sum of absolute differences of the current macro block is less than the total of the first average and a predetermined constant.

In an embodiment of the present invention, the motion detecting method further includes the following steps. Count a number of active flags set as 'motion' of all macro blocks of the current frame. Check if the number of the active flags set as 'motion' is greater than a third threshold. Set the current frame as 'motion' when the number of the active flags set as 'motion' is greater than the third threshold.

On the other hand, the present invention provides a motion detector, which includes a MB judgement unit. The MB judgment unit includes an intra-type judgement unit (I-type judgement unit) and a predictively-coded-type judgment unit (P-type judgement unit). The I-type judgement unit includes a first time-domain filter. The P-type judgement unit includes a second time-domain filter. The MB judgement unit receives a type and a motion vector of a current MB. When the type of the current MB is I-type, the first time-domain filter sets the active flag of the current MB as 'motion' when the current MB and a predetermined number of previous MBs prior to the current MB on a time axis are all intra-type. Otherwise, the first time-domain filter sets the active flag of the current MB as 'no-motion'. When the type of the MB is P-type, the second time-domain filter calculates an accumulated motion vector of the current MB according to the sum of the accumulated motion vector of the previous MB and the motion vector of the current MB. The second time-domain filter also checks whether or not the accumulated motion vector of the current MB is greater than a first threshold and. If it is greater than the first threshold, the active flag of the current MB is set as 'motion'.

Based on the depiction above, the present invention checks the type of the current MB to decide which of the I-type and the P-type the current MB belongs to so as to correspondingly execute the first procedure or the second procedure. The first procedure includes setting the active flag of the current MB according to the type of the previous MB. The second procedure includes setting the active flag of the current MB according to the motion vectors of the previous MB and the current MB. The present invention further uses time-domain filtering, spacial-domain filtering and filtering approach with multiple thresholds. In this way, the present invention is able to effectively reduce the probability of erroneous motion judgments.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

In the video processing technique, there are three major types of frame to be processed: intra-type (I-type) frame, predictively-coded type (P-type) frame and bi-predictive type (B-type) frame.

To suit the requirement of encoding, a frame is usually partitioned into a plurality of MBs. An MB is also correspondingly categorized into three types: I-type MB, P-type MB and B-type MB. An I-type frame contains I-type MBs only, a P-type frame can contain a combination of I-type MB and P-type MB and a B-type frame can contain a combination of I-type MB, P-type MB and B-type MB. The detail depiction about different types of frame and different types of MB can refer to H.264 standard.

It should be noted that in the embodiments of the present invention, each MB in a frame can be judged to be I-type MB or P-type MB, followed by performing a suitable processing with a different procedure, which is able to reduce the probability of erroneous motion judgments caused by noise. In the following, the depicted embodiments together with the included drawings are described.

Figure 1:
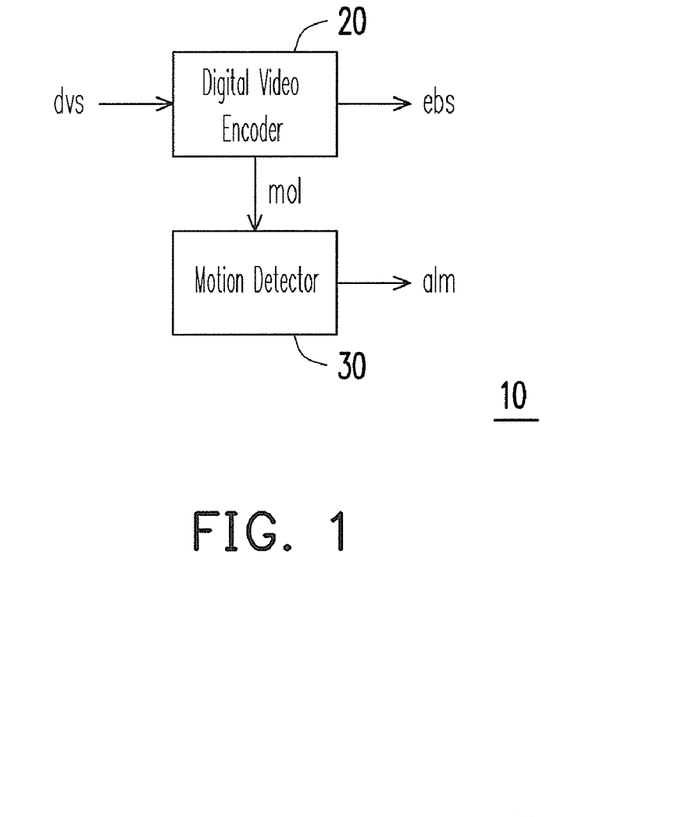
FIG. 1 is a diagram of a video processing device according to an embodiment of the present invention.

FIG. 1 is a diagram of a video processing device according to an embodiment of the present invention. Referring to FIG. 1, a video processing device 10 includes a digital video encoder 20 and a motion detector 30. The motion detector 30 is coupled to the digital video encoder 20. The digital video encoder 20 receives a digital video stream dvs and thereby produces motion-relevant information of MB mol and an encoded bitstream ebs. The motion detector 30 judges whether or not a motion event occurs according to the motion-relevant information of MB mol and accordingly produces an alarm signal alm.

Figure 2:
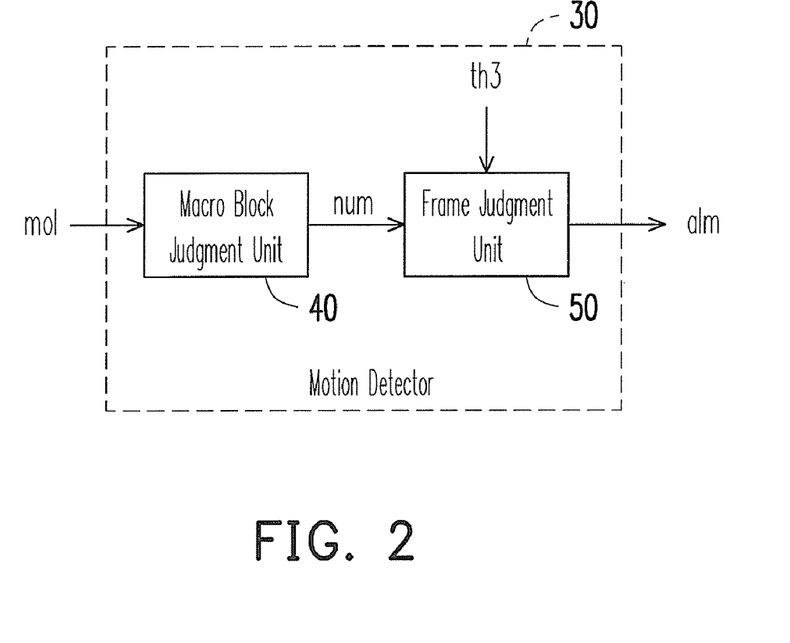
FIG. 2 is a diagram of a motion detector according to an embodiment of the present invention.

FIG. 2 is a diagram of a motion detector according to an embodiment of the present invention. Referring to FIG. 2, the motion detector 30 further includes an MB judgement unit 40 and a frame judgement unit 50, wherein the frame judgement unit 50 is coupled to the MB judgement unit 40.

The MB judgement unit 40 respectively judges whether or not a motion event of each MB occurs according to the motion-relevant information of MB mol and then provides the number of active MBs num in the frame to the frame judgement unit 50 based on the above-mentioned judgement. After that, the frame judgement unit 50 further judges whether or not the frame is in 'motion' according to the number of active MBs num in the frame based on the above-mentioned judgement. For example, the frame judgement unit 50 may check whether or not the number of active MBs num in the frame based on the above-mentioned judgement is greater than a threshold th3. If num is greater than th3, the frame is regarded as in 'motion' and the alarm signal alm is produced; otherwise, the frame is regarded as 'no-motion'.

Figure 3:
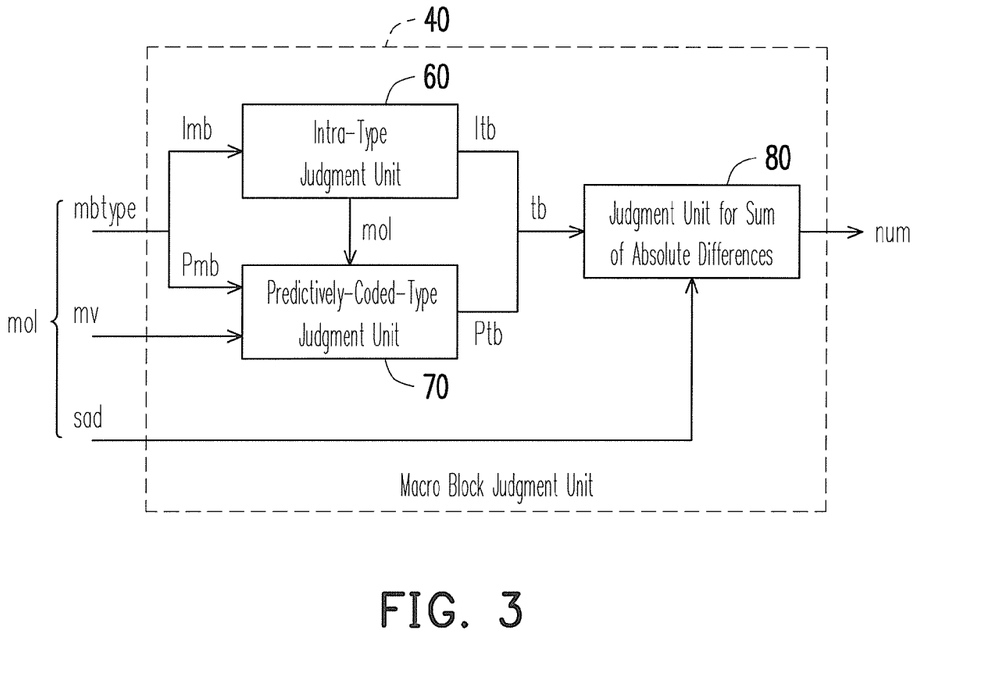
FIG. 3 is a diagram of a motion detector according to an embodiment of the present invention.

FIG. 3 is a diagram of a motion detector according to an embodiment of the present invention. Referring to FIG. 3, in the embodiment, the MB judgement unit 40 can include an I-type judgement unit 60, a P-type judgement unit 70 and a judgement unit for sum of absolute differences 80. The judgement unit for sum of absolute differences 80 is coupled to the I-type judgement unit 60 and the P-type judgement unit 70. In the embodiment, the motion-relevant information mol of MB includes, for example, MB type mbtype, motion vector mv and sum of absolute difference sad, wherein the MB type mbtype includes I-type Imb and P-type Pmb.

The motion-relevant information of MB mol and the MB type mbtype, motion vector mv and sum of absolute difference sad thereof in the embodiment can refer to H.264 standard, which are omitted to describe for simplicity.

Figure 4:
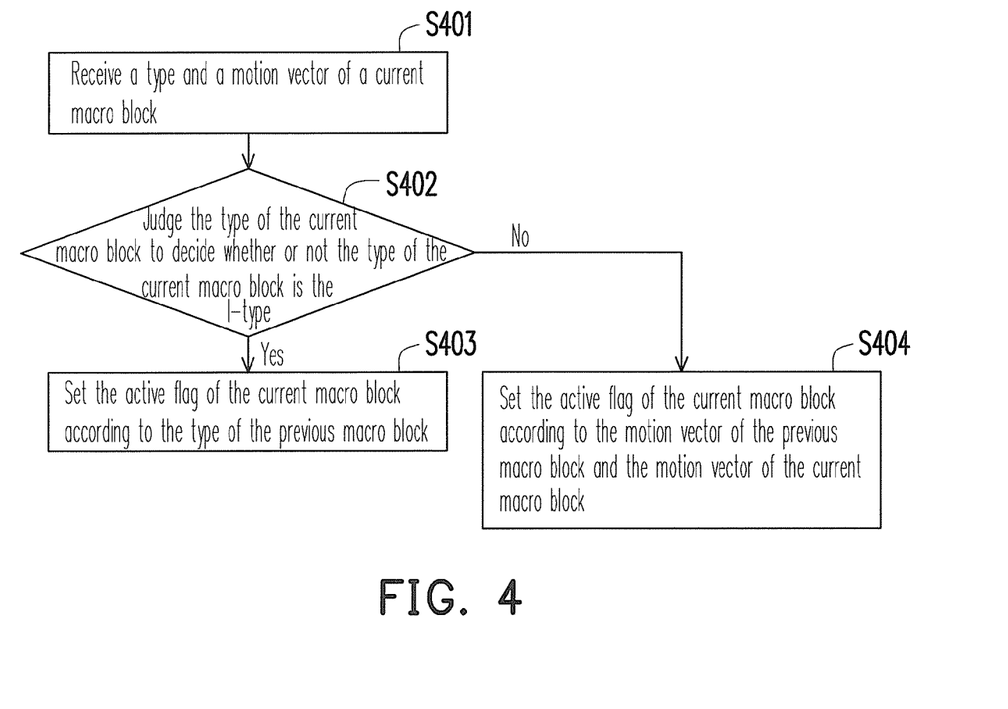
FIG. 4 is a flowchart of a motion detecting method according to an embodiment of the present invention.

FIG. 4 is a flowchart of a motion detecting method according to an embodiment of the present invention. Referring to FIGS. 3 and 4, first in step S401, the MB judgement unit 40 receives a type and a motion vector of a current MB. Next in step S402, the MB judgement unit 40 judges the type of the current MB to decide whether or not the type of the current MB is the I-type. If the type of the current MB is the I-type, the procedure goes to step S403; otherwise, the type of the current MB is the P-type and the procedure goes to step S404.

In step S403, the I-type judgement unit 60 sets the active flag of the current MB according to the type of the previous MB. In step S404, the P-type judgement unit 70 sets the active flag of the current MB according to the motion vector of the previous MB and the motion vector of the current MB. The details of the above-mentioned steps are in follows.

Figure 5:
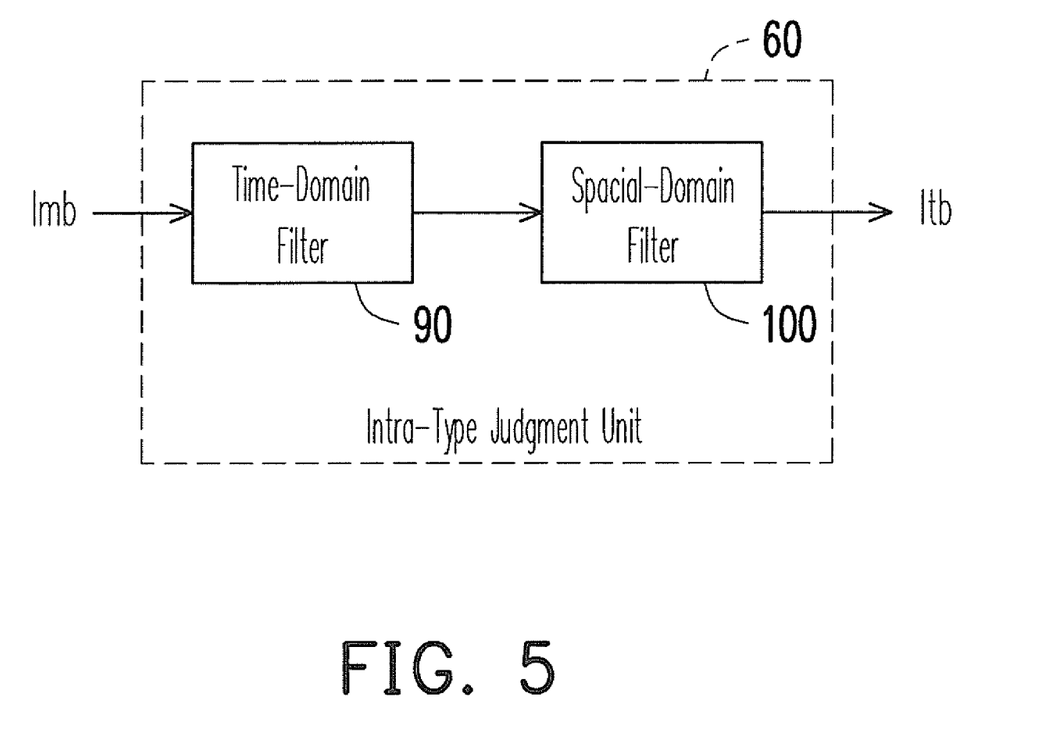
FIG. 5 is a diagram of an I-type judgement unit according to an embodiment of the present invention.

FIG. 5 is a diagram of an I-type judgement unit according to an embodiment of the present invention. Referring to FIG. 5, in the embodiment, the I-type judgement unit 60 includes a time-domain filter 90 and a spacial-domain filter 100. The spacial-domain filter 100 is coupled to the time-domain filter 90. The time-domain filter 90 receives the I-type current MB Imb and checks whether or not the current MB Imb and a predetermined number of previous MBs prior to the current MB Imb on a time axis are all I-type. The previous MBs and the current MB Imb have the same position in their corresponding frames. The predetermined number may be one, two, three, or any other positive integer. The time-domain filter 90 sets the active flag of the current MB Imb as 'motion' when the current MB Imb and the predetermined number of previous MBs are all I-type. When any one of the previous MBs is P-type, the time-domain filter 90 sets the active flag of the current MB Imb as 'no-motion'. The predetermined number may be zero. In this case, the time-domain filter 90 sets the active flag of the current MB Imb as 'motion' as long as the current MB is I-type regardless of the type of the previous MBs. It should be noted that in the embodiment, the time-domain filter 90 is used to process the I-type MBs only. If the time-domain filter 90 does not receive any MB within a duration, it can be assumed that the corresponding MBs within the above-mentioned duration are P-type.

Usually, a video stream includes about 30 frames within a second, which means there is little time difference between two successive frames. Generally, an object does not move fitfully. Therefore, if an object moving fitfully is detected in successive frames, it indicates a noise may be present. The present invention uses the above-mentioned scheme to reduce the influence of noise.

Figure 6:
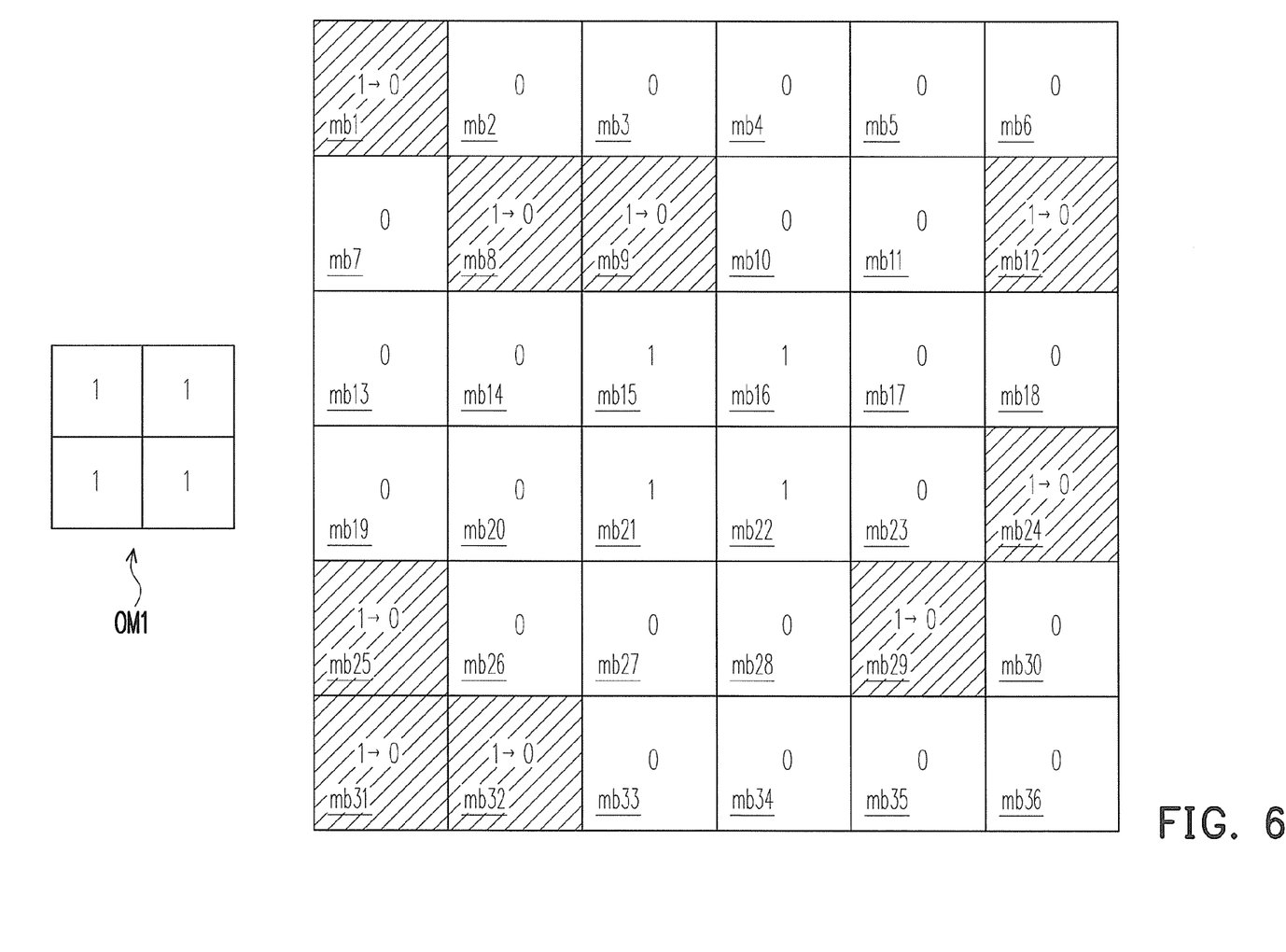
FIG. 6 is a diagram showing the active flag of each MB of a frame according to an embodiment of the present invention.

The spacial-domain filter 100 can receive the active flags of all MBs output by the time-domain filter 90 within a frame and conduct a spatial filtering on the received active flags. FIG. 6 is a diagram showing the active flag of each MB of a frame according to an embodiment of the present invention. Referring to FIG. 6, in the embodiment, a frame supposedly includes 36 MBs notated with mb1-mb36 The active flags of the MBs mb1, mb8, mb9, mb12, mb15, mb16, mb21, mb22, mb24, mb25, mb29, mb31 and mb32 are initially set as '1' indicating 'motion', while the active flags of the other MBs are set as '0' indicating 'no-motion'. In the following, a spatial filtering approach is provided for anyone skilled in the art to refer to.

FIG. 6 also shows a preset shape and the active flags after conducting a spatial filtering according to an embodiment of the present invention. Referring to FIG. 6, in the embodiment, a preset square shape is used as an operation mask OM1 for conducting a spatial filtering on all the active flags of the frame of FIG. 6. In more details, the spacial-domain filter 100 is used to check the active flag of each MB set as 'motion' to decide whether or not the checked active flags are respectively aggregated in the above-mentioned preset shape in spacial domain. If the checked active flags are respectively aggregated in the preset shape, the aggregated active flags remain. Otherwise, the active flag of each of the MBs not aggregated in the preset shape is set as 'no-motion'. In other words, the active flags of the MBs mb1, mb8, mb9, mb12, mb24, mb25, mb29, mb31 and mb32 in the embodiment are set as '0'.

A moving object in a video frame usually has a certain volume. If it is found by checking an object with a small area is moving, it can be considered noise is present. It can be seen that the above-mentioned scheme can reduce the influence of noise.

Figure 7:
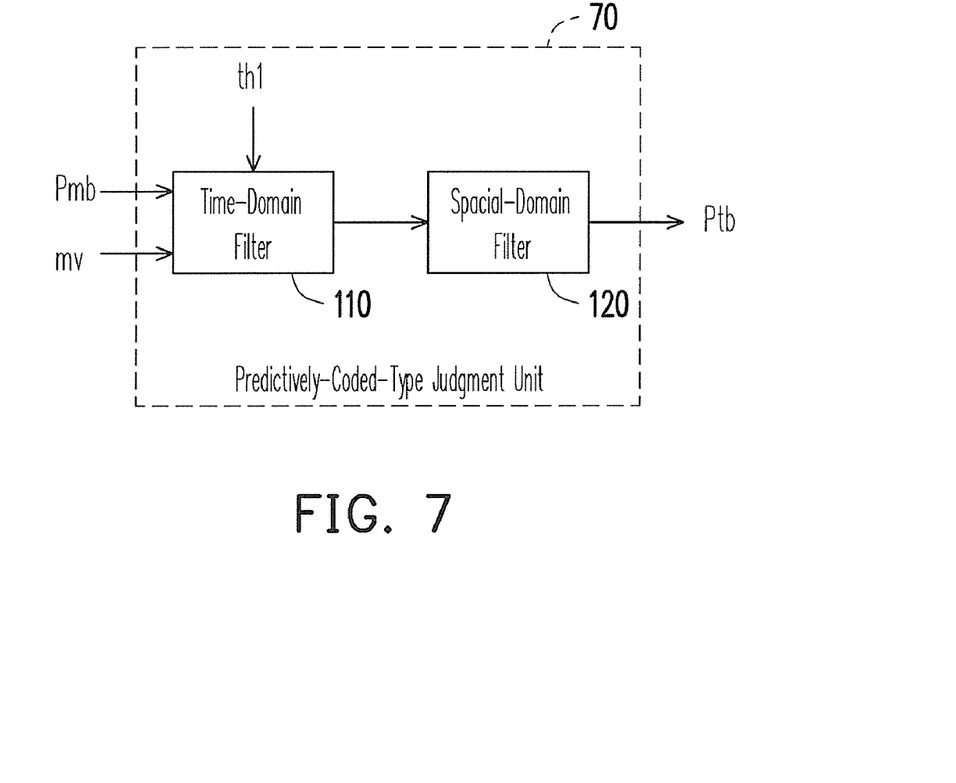
FIG. 7 is a diagram of a P-type judgement unit according to an embodiment of the present invention.

FIG. 7 is a diagram of a P-type judgement unit according to an embodiment of the present invention. Referring to FIG. 7, in the embodiment, the P-type judgement unit 70 can include a time-domain filter 110 and a spacial-domain filter 120. The spacial-domain filter 120 is coupled to the time-domain filter 110. The time-domain filter 110 receives the P-type current MB Pmb and calculates a scalar converted from the accumulated motion vector of the current MB according to a scalar converted from an accumulated motion vector of the first previous MB and another scalar converted from the motion vector of the current MB. The time-domain filter 110 also sets the active flag of the current MB as 'motion' or 'no-motion' according to the scalar converted from the accumulated motion vector of the current MB. An embodiment is depicted in follows for anyone skilled in the art to refer to.

First, each vector is respectively converted into a scalar for the convenience of the following calculations. For example, the mean square root of all components of each vector or the sum of the square values of all components thereof is taken to convert each vector into a scalar; or the amount of each vector is taken as a corresponding scalar. Next, the scalar converted from the accumulated motion vector of the current MB is obtained according to the following formula (1):

$$mvs_{accum}(t) = w_{mv} \times mvs(t) + (1 - w_{mv}) \times mvs_{accum}(t-1) \qquad (1)$$

wherein $mvs_{accum}(t)$ represents the scalar converted according to the accumulated motion vector of the current MB, $mvs(t)$ represents the scalar converted according to the motion vector of the current MB, $mvs_{accum}(t-1)$ represents the scalar converted according to the accumulated motion vector of the previous MB at the same position in the frame as the current MB and $w_{mv}$ is a constant ranging between 0 and 1. In the embodiment, $w_{mv}$ can be 0.3, which the present invention is not limited to.

After that, the time-domain filter 110 judges the scalar converted from the accumulated motion vector of the current MB to decide whether or not the scalar is greater than a threshold th1. If the scalar is greater than the threshold th1, the active flag of the current MB is set by the time-domain filter 110 as 'motion'; otherwise, the active flag of the current MB is set as 'no-motion'. In this way, the effect similar to the time-domain filter 90 is achieved.

In addition, the spacial-domain filter 120 in the embodiment can be realized following, for example, the spacial-domain filter 100 so as to achieve the effect similar to the spacial-domain filter 100, which is omitted to describe.

Then continuing to FIG. 3, the judgement unit for sum of absolute differences 80 receives all the active flags Itb set by the I-type judgement unit 60 of the set of first MBs and all the active flags Ptb set by the P-type judgement unit 70 of the set of second MBs, wherein the active flags Itb of the set of first MBs and the active flags Ptb of the set of second MBs may be combined into active flags tb of all the MBs of a complete frame. In more details, all the active flags Itb of the set of first MBs are the active flags of all the MBs with I-type in the current frame; all the active flags Ptb of the set of second MBs are the active flags of all the MBs with P-type in the current frame. All the active flags tb of all the MBs of the complete frame are the union set of the active flags Itb of the first MB set and the active flags ptb of the second MB set.

Figure 8:
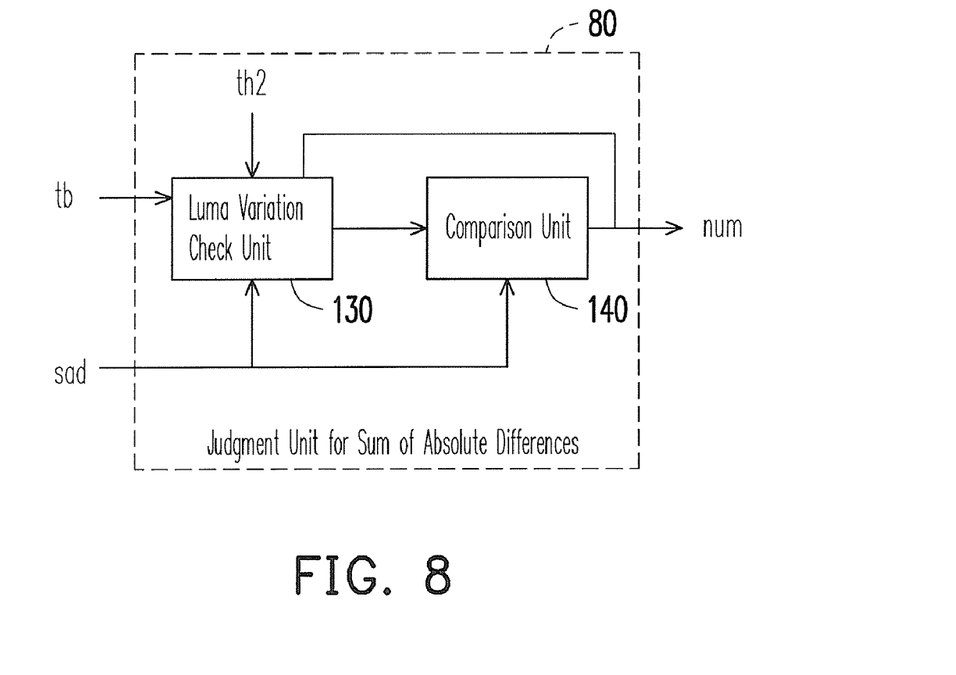
FIG. 8 is a diagram of a judgement unit for sum of absolute differences according to an embodiment of the present invention.

FIG. 8 is a diagram of a judgement unit for sum of absolute differences according to an embodiment of the present invention. Referring to FIG. 8, in the embodiment, the judgement unit for sum of absolute differences 80 includes a luma variation check unit 130 and a comparison unit 140. The comparison unit 140 is coupled to the luma variation check unit 130. The luma variation check unit 130 receives all the active flags tb of all the MBs of the entire frame. For each frame in the digital video stream, the luma variation check unit 130 calculates the average of the sums of absolute differences of macro blocks whose motion vector is zero (average still SAD) of that frame. This is based on the assumption that the average still SAD is treated as the noise when motion vector is zero. The luma variation check unit 130 compares the average still SAD of the current frame with the average still SAD of the previous frame. When the difference between the average still SAD of the current frame and the average still SAD of the previous frame is greater than the threshold th2, the current frame is considered as a luma variation frame. In this case, the luma variation check unit 130 sets the number of 'motion' active flags of the current frame (denoted as 'num' in FIG. 8) as zero. The above-mentioned scheme is advantageous in reducing the misjudgement chance of a frame due to the phenomenon known as luma variation.

The comparison unit 140 receives all the active flags tb of all the MBs of the entire current frame. The comparison unit 140 also receives the average still SAD of the current frame from the luma variation check unit 130. The comparison unit 140 filters the macro blocks whose active flags are already set as 'motion' with the average still SAD of the current frame. In other words, the comparison unit 140 respectively compares the sum of absolute differences sad of each MB whose active flag is already set as 'motion' with the average still SAD of the current frame. If the sum of absolute differences sad is less than the total of the average still SAD of the current frame and a predetermined constant, the comparison unit 140 resets the active flag of the corresponding MB as 'no-motion'. The comparison unit 140 also counts the total number of MBs whose active flags are set as 'motion' in the whole frame ('num' in FIG. 8). The above-mentioned scheme is advantageous in filtering noise.

It should be noted that although the above-mentioned embodiments have depicted a feasible implement scheme of the motion detecting method and the motion detector, however, anyone skilled in the art should be aware of that each manufacture has a different design of the motion detecting method and motion detector. Accordingly, the present invention is not limited to the above-mentioned implement. In other words, once an implement performs the first procedure or the second procedure according to the type of MB, wherein the first procedure sets the active flag of the current MB according to the type of the previous MB and the second procedure sets the active flag of the current MB according to the motion vectors of the previous MB and the current MB, the implement has fallen within the spirit of the present invention. In order to provide the people skilled in the art with more details of the present invention, more embodiments are depicted in the following.

Figure 9:
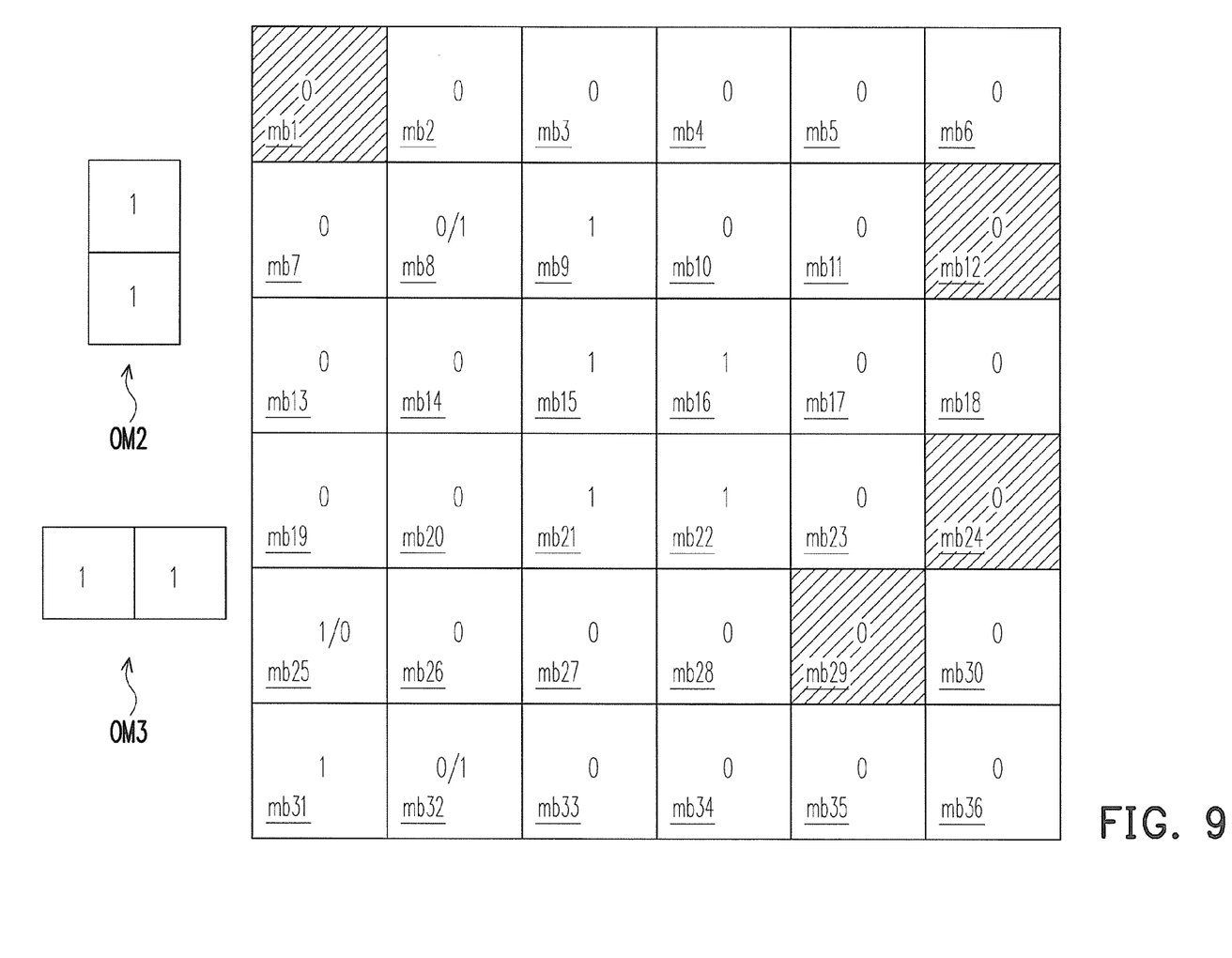
FIG. 9 is a diagram showing another two preset shapes and the active flags of FIG. 6 after conducting another spatial filtering according to an embodiment of the present invention.

It should be noted that although the preset square shape in FIG. 6 is used for conducting spatial filtering on all the active flags of the frame of FIG. 6, but it is a selected embodiment only. In other embodiments, anyone skilled in the art can select different preset shapes according to different requirements as an operation mask for conducting a spatial filtering on all the active flags of the frame. For example, FIG. 9 is a schematic diagram showing another two preset shapes and the active flags of FIG. 6 after conducting another spatial filtering according to an embodiment of the present invention. In FIG. 9, the active flags of the MBs mb1, mb8, mb12, mb24, mb29 and mb32 are set as '0' according to the operation mask OM2. The active flags of the MBs mb1, mb12, mb24, mb25 and mb29 are set as '0' according to the operation mask OM3. The embodiment can achieve the same effect as the above-mentioned embodiment as well.

Figure 10:
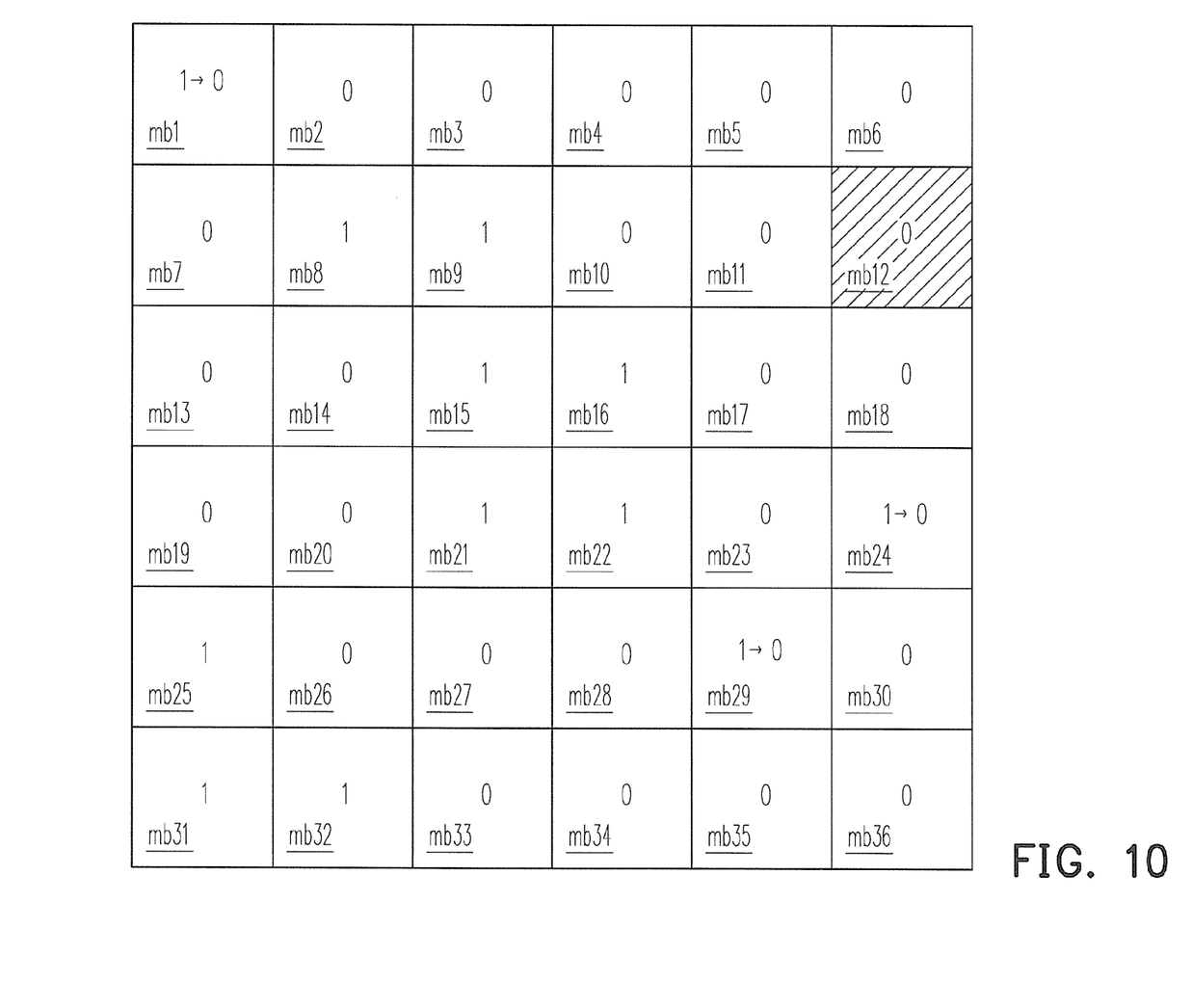
FIG. 10 is a diagram showing the active flags of FIG. 6 after conducting another spatial filtering according to an embodiment of the present invention.

In other embodiments, the spacial-domain filter 100 checks whether or not the active flags of all the MBs set as 'motion' in FIG. 6 are adjacent to each other in spacial domain. If the checked active flags of the MBs are not adjacent to each other, the corresponding active flags are set as 'no-motion'. FIG. 10 is a schematic diagram showing the active flags of FIG. 6 after conducting another spatial filtering according to an embodiment of the present invention. In FIG. 10, the active flags of all the MBs set as 'motion' are checked to decide whether or not the active flags of all the MBs are adjacent to each other in any one of the eight directions in spacial domain. If they are not adjacent to each other in any one of the eight directions in spacial domain, the active flags of the MBs un-adjacent to each other are set as 'no-motion', and thereby the active flag of the MB mb12 is set as '0'.

Alternatively, in FIG. 10, the active flags of all the MBs set as 'motion' may be checked to decide whether or not the active flags of the MBs are adjacent to each other in any one of the four directions in spacial domain. If they are not adjacent to each other in any one of the four directions in spacial domain, the active flags of the MBs un-adjacent to each other are set as 'no-motion', and thereby the active flags of the MBs mb1, mb12, mb24 and mb29 are set as '0'. In this way, the embodiment can achieve the same effect as the above-mentioned embodiment as well.

It should be noted that anyone skilled in the art can modify the architecture of any unit in the motion detector 30 according to the requirements thereof. For example, although the motion detector 30 in the above-mentioned embodiments includes the MB judgement unit 40 and the frame judgement unit 50 only, but in other embodiments, the frame judgement unit 50 can be saved.

Further, although the judgement unit for sum of absolute differences 80 of the MB judgement unit 40 in the above-mentioned embodiments is disposed after the I-type judgement unit 60 and the P-type judgement unit 70, but in other embodiments, the judgement unit for sum of absolute differences 80 can be disposed prior to the I-type judgement unit 60 and the P-type judgement unit 70.

Moreover, although the I-type judgement unit 60 and the P-type judgement unit 70 in the above-mentioned embodiments include the time-domain filter and the spacial-domain filter, but in other embodiments, the spacial-domain filter can be saved both in the I-type judgement unit 60 and the P-type judgement unit 70. In further another embodiment, the spacial-domain filter can be disposed prior to the time-domain filter.

Besides, although the judgement unit for sum of absolute differences 80 in the above-mentioned embodiments includes the luma variation check unit 130 and the comparison unit 140, but in other embodiments, one of the luma variation check unit 130 and the comparison unit 140 in the judgement unit for sum of absolute differences 80 can be saved. In further another embodiment, the luma variation check unit 130 can be disposed prior to the comparison unit 140.

In summary, the present invention performs the first procedure or the second procedure according to the type of the MB, wherein the first procedure sets the active flag of the current MB according to the type of the previous MB and the second procedure sets the active flag of the current MB according to the motion vectors of the previous MB and the current MB. In this way, the present invention can effectively reduce the misjudgement chance due to noise. In addition, the time filtering and the spatial filtering are used in the embodiments of the present invention so as to further reduce the misjudgement chance due to noise. The present invention further uses a scheme of judging the sum of absolute differences so as to reduce the misjudgement chance due to luma variation or visual variation.

Each of the units and filters in the motion detector of the present invention can be respectively implemented by software, firmware or hardware. For example, a digital signal circuit or a processor can be used to execute a corresponding software code or a firmware program to realize the functions of each unit and each filter, which further accomplishes the integrated function of the motion detector of the present invention.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A motion detecting method, comprising:
    receiving a type and a motion vector of a current macro block by a motion detector;
    judging the type of the current macro block;
    when the type of the current macro block is intra-type, performing a first procedure, wherein the first procedure comprises:
        setting an active flag of the current macro block as no-motion when the current macro block and a predetermined number of previous macro blocks prior to the current macro block on a time axis are all intra-type wherein the current macro block and the predetermined number of previous macro blocks have a same frame position; and
    when the type of the current macro block is predictively-coded type, performing a second procedure, wherein the second procedure comprises:
        calculating a scalar converted from an accumulated motion vector of the current macro block according to a first scalar converted from an accumulated motion vector of a first previous macro block and a second scalar converted from the motion vector of the current macro block; and
        checking if the scalar is greater than a first threshold; and
        setting the active flag of the current macro block as motion when the scalar is greater than the first threshold.

2. The motion detecting method as claimed in claim 1, wherein the first procedure further comprises:
    checking if the type of a previous macro block is predictively-coded type;
    setting the active flag of the current macro block as 'no-motion' when the previous macro block is predictively-coded type, wherein the previous macro block is located prior to the current macro block on the time axis.

3. The motion detecting method as claimed in claim 1, wherein the first procedure further comprises:
    receiving a plurality of active flags of a plurality of macro blocks of a current frame, wherein the macro blocks comprise the current macro block;
    checking every one of the plurality of active flags set as 'motion' to find out which one of the plurality of active flags doesn't match a preset shape in spacial domain; and
    resetting each one of the plurality of active flags that doesn't match the preset shape as 'no-motion'.

4. The motion detecting method as claimed in claim 1, wherein the second procedure further comprises:
    receiving a plurality of active flags of a plurality of macro blocks of a current frame, wherein the macro blocks comprise the current macro block;
    checking every one of the plurality of active flags set as 'motion' to find out which one of the plurality of active flags doesn't match a preset shape in spacial domain; and
    resetting each one of the plurality of active flags that doesn't match the preset shape as 'no-motion'.

5. The motion detecting method as claimed in claim 1, further comprising:
    calculating a first average of sums of absolute differences of macro blocks whose motion vector is zero of a current frame, wherein the current frame comprises the current macro block;
    calculating a second average of sums of absolute differences of macro blocks whose motion vector is zero of a previous frame; and
    setting a number of 'motion' active flags of the current frame as zero when a difference between the first average and the second average is greater than a second threshold.

6. The motion detecting method as claimed in claim 5, further comprising:
    comparing a sum of absolute differences of the current macro block with the first average when the active flag of the current macro block is already set as 'motion'; and
    resetting the active flag of the current macro block as 'no-motion' when the sum is less than a total of the first average and a predetermined constant.

7. The motion detecting method as claimed in claim 1, further comprising:
    counting a number of active flags set as 'motion' of macro blocks of a current frame;
    checking if the number is greater than a third threshold; and
    setting the current frame as 'motion' when the number is greater than the third threshold.

8. A motion detector, comprising:
    a macro block judgment unit, receiving a type and a motion vector of a Current macro block and comprising:
    an intra-type judgment unit, comprising:
        a first time-domain filter for setting an active flag of the current macro block as motion when the current macro block and a predetermined number of previous macro blocks prior to the current macro block on a time axis are all intra-type wherein the current macro block and the predetermined number of previous macro blocks have a same frame position; and
    a predictively-coded-type judgment unit, coupled to the intra-type judgment unit and comprising:
        a second time-domain filter for calculating a scalar converted from an accumulated motion vector of the current macro block according to a first scalar converted from an accumulated motion vector of a first previous macro block and a second scalar converted from the motion vector of the current macro block, checking if the scalar is greater than a first threshold, and setting the active flag of the current macro block as motion when the scalar is greater than the first threshold.

9. The motion detector as claimed in claim 8, wherein the intra-type judgment unit further comprises:
    a spacial-domain filter, coupled to the first time-domain filter, for receiving a plurality of active flags of a plurality of macro blocks of a current frame, checking every one of the plurality of active flags set as 'motion' to find out which one of the plurality of active flags doesn't match a preset shape in spacial domain; and resetting each one of the plurality of active flags that doesn't match the preset shape as 'no-motion', wherein the macro blocks comprise the current macro block.

10. The motion detector as claimed in claim 8, wherein the predictively-coded-type judgment unit further comprises:
a spacial-domain filter, coupled to the second time-domain filter, for receiving a plurality of active flags of a plurality of macro blocks of a current frame, checking every one of the plurality of active flags set as 'motion' to find out which one of the plurality of active flags doesn't match a preset shape in spacial domain; and resetting each one of the plurality of active flags that doesn't match the preset shape as 'no-motion', wherein the macro blocks comprise the current macro block.

11. The motion detector as claimed in claim 8, wherein the macro block judgment unit further comprises:
a judgment unit for sum of absolute differences, coupled to the intra-type judgment unit and the predictively-coded-type judgment unit, comprising:
a luma variation check unit for calculating a first average of sums of absolute differences of macro blocks whose motion vector is zero of a current frame, wherein the current frame comprises the current macro block, calculating a second average of sums of absolute differences of macro blocks whose motion vector is zero of a previous frame, and setting a number of 'motion' active flags of the current frame as zero when a difference between the first average and the second average is greater than a second threshold.

12. The motion detector as claimed in claim 11, wherein the judgment unit for sum of absolute differences further comprising:
a comparison unit, for comparing a sum of absolute differences of the current macro block with the first average when the active flag of the current macro block is already set as 'motion', and resetting the active flag of the current macro block as 'no-motion' when the sum is less than a total of the first average and a predetermined constant.

13. The motion detector as claimed in claim 12, further comprising:
a frame judgment unit, coupled to the comparison unit, for counting a number of active flags set as 'motion' of macro blocks of a current frame, checking if the number is greater than a third threshold, and setting the current frame as 'motion' when the number is greater than the third threshold.

* * * * *